US012724339B2

(12) United States Patent
Okada

(10) Patent No.: US 12,724,339 B2
(45) Date of Patent: Sep. 1, 2026

(54) ATTACHMENT OPTICAL SYSTEM AND IMAGE PICKUP APPARATUS

(71) Applicant: CANON KABUSHIKI KAISHA, Tokyo (JP)

(72) Inventor: Takashi Okada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 504 days.

(21) Appl. No.: 18/321,059

(22) Filed: May 22, 2023

(65) Prior Publication Data

US 2024/0004163 A1 Jan. 4, 2024

(30) Foreign Application Priority Data

Jun. 30, 2022 (JP) ................................ 2022-105842

(51) Int. Cl.
*G03B 35/10* (2021.01)
*G02B 13/00* (2006.01)

(52) U.S. Cl.
CPC ......... *G03B 35/10* (2013.01); *G02B 13/0065* (2013.01)

(58) Field of Classification Search
CPC ............................ G03B 35/10; G02B 13/0065
See application file for complete search history.

(56) References Cited

U.S. PATENT DOCUMENTS 9,151,938 B2 10/2015 Okada
10,969,564 B2 4/2021 Okada
2013/0127997 A1* 5/2013 Inomoto ................ H04N 13/20 348/46
2021/0302695 A1 9/2021 Okada
2022/0007002 A1* 1/2022 Uehara .................. G02B 23/18

FOREIGN PATENT DOCUMENTS

JP S63-205626 A 8/1988
JP H07134345 A 5/1995
JP 2005241791 A 9/2005
JP 2013109009 A 6/2013
JP 2005-128286 A 5/2015
JP 2020008629 A 1/2020
JP 2020-071399 A 5/2020

OTHER PUBLICATIONS

Notice of Reasons for Refusal issued by the Japanese Patent Office on Mar. 31, 2026 in corresponding JP Patent Application No. 2022-105842, with English translation.

* cited by examiner

*Primary Examiner* — Wen Huang
(74) *Attorney, Agent, or Firm* — Carter, DeLuca & Farrell LLP

(57) ABSTRACT

An attachment optical system, to which an imaging lens is attachable on an object side of the attachment optical system includes two bending optical systems arranged in parallel. Each of the two bending optical systems includes a first reflective member and a second reflective member. Each of the two bending optical systems includes, in order from the object side to an image side, a front unit and a rear unit, which are separated by a maximum air gap on an optical axis in each bending optical system. At least one of the first reflective member and the second reflective member is disposed between a surface having refractive power and disposed closest to an object in the rear unit and a surface having refractive power and disposed closest to an image plane in the rear unit of each bending optical system.

15 Claims, 6 Drawing Sheets

ATTACHMENT OPTICAL SYSTEM AND IMAGE PICKUP APPARATUS

BACKGROUND

Technical Field

One of the aspects of the embodiment relates to an attachment optical system attachable between an interchangeable lens and an image pickup apparatus, and more particularly to an attachment optical system suitable for stereoscopic imaging.

Description of Related Art

Observation apparatuses and contents that provide a sense of reality, such as virtual reality (VR) and augmented reality (AR), have recently been demanded. Accordingly, image pickup apparatuses for capturing images for the contents have increasingly demanded. In particular, the user may be able to arbitrarily select an imaging area to be captured, and to capture high-quality images, in order to express a variety of images.

Japanese Patent Laid-Open Nos. 2020-71399 and 2005-128286 disclose a stereoscopic imaging optical system configured to provide intermediate imaging. Japanese Patent Laid-Open No. 63-205626 discloses a relay optical system configured to relay a primary imaging plane of an interchangeable lens to a secondary imaging plane.

However, the specifications of the stereoscopic imaging optical systems disclosed in Japanese Patent Laid-Open Nos. 2020-71399 and 2005-128286 are fixed to a wide-angle range, and require an image to be cut out in expanding the imaging range. Thus, these optical systems cause image quality to be degraded or post-imaging processing to be complicated.

The relay optical system disclosed in Japanese Patent Laid-Open No. 63-205626 can change the imaging range by changing the interchangeable lens but has a configuration that is not suitable for the stereoscopic optical system because it is an interchangeable back unit for video. More specifically, a base length for a stereoscopic optical system is ideally about the width between the human eyes, but the relay optical system disclosed in Japanese Patent Laid-Open No. 63-205626 causes the base length to be too long.

SUMMARY

An attachment optical system according to one aspect of the embodiment, to which an imaging lens is attachable on an object side of the attachment optical system includes two bending optical systems arranged in parallel. Each of the two bending optical systems includes a first reflective member and a second reflective member. Each of the two bending optical systems includes, in order from the object side to an image side, a front unit and a rear unit, which are separated by a maximum air gap on an optical axis in each bending optical system. At least one of the first reflective member and the second reflective member is disposed between a surface having refractive power and disposed closest to an object in the rear unit and a surface having refractive power and disposed closest to an image plane in the rear unit of each bending optical system. An image pickup apparatus having the above attachment optical system also constitutes another aspect of the disclosure.

Further features of the disclosure will become apparent from the following description of embodiments with reference to the attached drawings.

DESCRIPTION OF THE EMBODIMENTS

Figure 1:
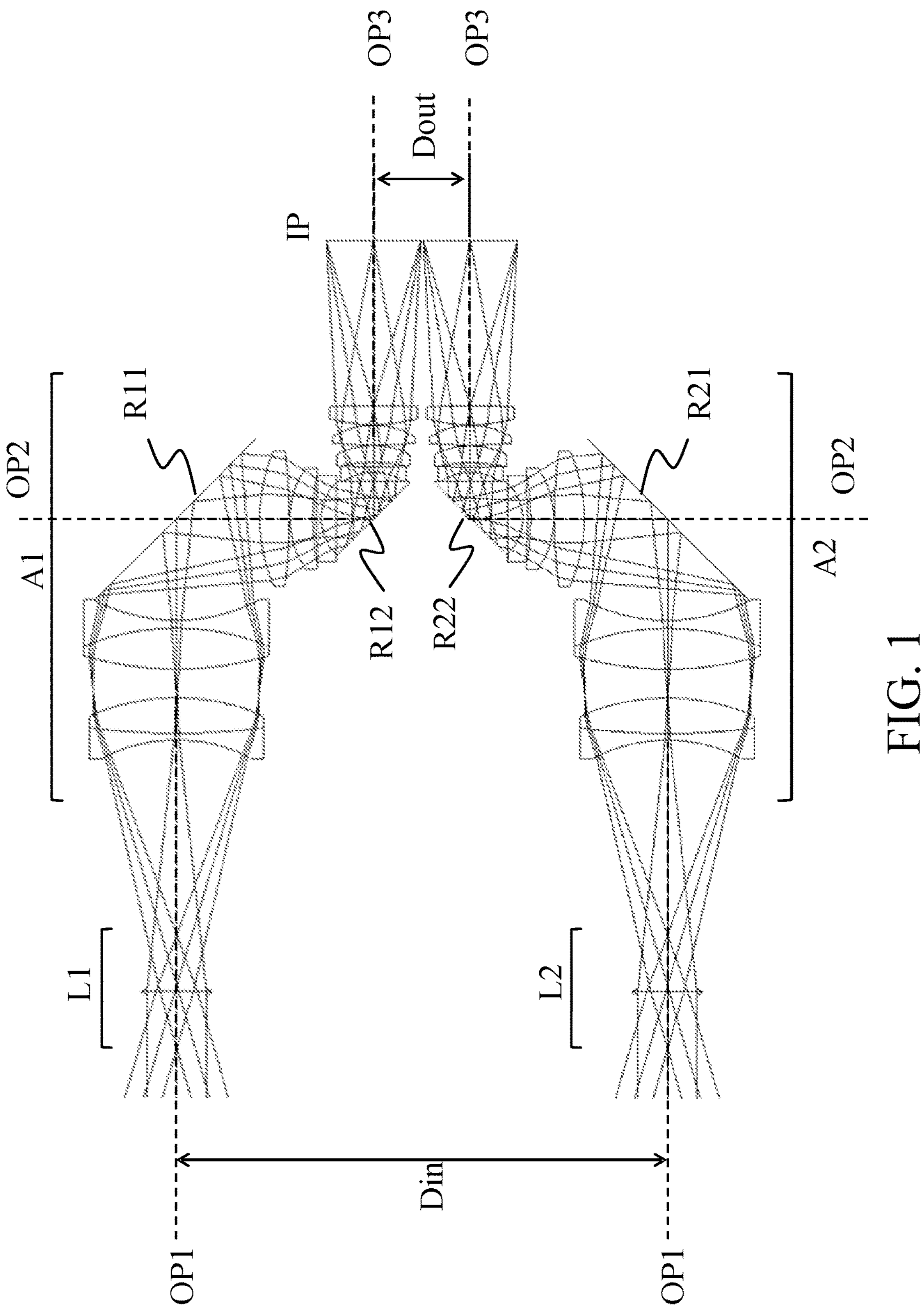
FIG. 1 is a sectional view of a stereoscopic optical system that includes an interchangeable lens and an attachment optical system according to Example 1.

Referring now to the accompanying drawings, a description will be given of an attachment optical system according to examples of the present disclosure and an image pickup apparatus having the same.

A method using a stereoscopic imaging optical system is known as a general method for obtaining images that provide a sense of reality such as virtual reality (VR) and augmented reality (AR). The stereoscopic imaging optical system includes two optical systems arranged in parallel with respect to an object. The stereoscopic imaging optical system is an optical system that acquires distance information of the object by using the principle of triangulation and captures a stereoscopic image. One type of stereoscopic imaging optical system realizes stereoscopic imaging by arranging two image sensors or two image pickup apparatuses in parallel and connecting the respective captured images. However, this type of method complicates the connection work. For example, this method requires highly accurate alignment between the optical axes of the two image pickup apparatuses and thus the accurate arrangement of these image pickup apparatuses. In addition, the imaging timings of the two image pickup apparatuses must accord or synchronize.

For simpler work, another conventional optical system forms optical images through two optical systems on a single image sensor. An image pickup apparatus using this optical system guarantees optical axis alignment and captures images at the same time. Therefore, the above work to be performed by the user becomes unnecessary, and stereoscopic imaging can be easily performed.

There are a plurality of optical systems that can provide stereoscopic imaging with a single image sensor, including the optical systems disclosed in the above patent documents. However, in any document, the specifications of the imaging lens are fixed, and imaging can be performed at a fixed imaging angle of view. On the other hand, the user wishes to change the imaging angle of view according to objects and imaging scenes. The attachment optical system according to each example meets these needs.

The attachment optical system according to each example is an attachment optical system to which imaging lenses L1 and L2 are attachable on the object side of the attachment optical system. The attachment optical system according to each example includes two bending optical systems A1 and A2 arranged in parallel with respect to a single image sensor. Each of the two bending optical systems A1 and A2 includes a first reflective member R11 (R21) and a second reflective member R12 (R22), relays an optical image from the imaging lenses L1 and L2, and forms the image on the image sensor. Arranging these bending optical systems A1 and A2 in parallel can form the optical images of the two imaging lenses L1 and L2 side by side on a single image sensor and provide stereoscopic imaging. Since the imaging lenses L1 and L2 arranged on the object side of the attachment optical system can be arbitrarily selected by the user, the imaging angle of view can be changed according to imaging scenes and thereby the user can expand the expression range.

FIG. 1 is a sectional view of a stereoscopic optical system that includes interchangeable lenses as the imaging lenses L1 and L2 and the attachment optical system according to Example 1. In FIG. 1, the attachment optical system according to Example 1 is illustrated as a representative example, but any one of the attachment optical systems of the other examples may be used. The attachment optical system includes a bending optical system A1 and a bending optical system A2, relays optical images from the imaging lens L1 and the imaging lens L2, and forms two images on an image plane IP. In FIG. 1, the imaging lens L1 and the imaging lens L2 are indicated by arrows as aberration-free lenses that form ideal images, but in actual use, they have one or more lenses. The bending optical system A1 includes a first reflective member R11 and a second reflective member R12. The bending optical system A2 includes a first reflective member R21 and a second reflective member R22. First optical axes OP1 from the object are bent by the first reflective members R11 and R21 and guided to second optical axes OP2, and the second optical axes are bent by the second reflective members R12 and R22 to third optical axes OP3. Thereby, optical images are formed by the imaging lenses L1 and L2 on the image plane IP. In FIG. 1, the optical axes are bent at 90 degrees by the first reflective members R11 and R21 and the second reflective members R12 and R22. The bending angle is not limited to 90 degrees.

Figure 2:
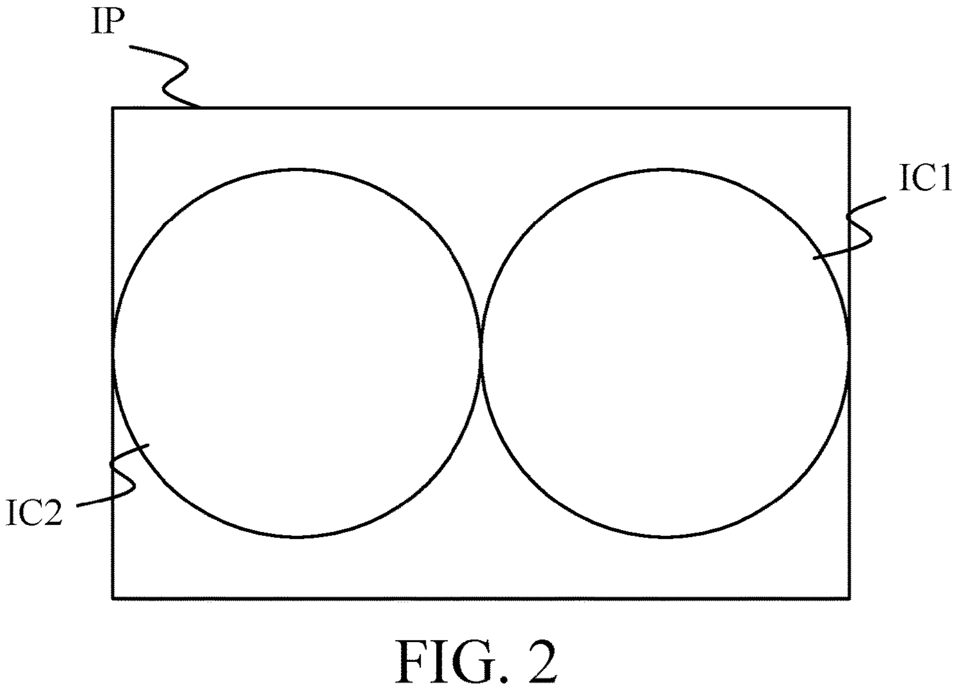
FIG. 2 schematically illustrates two image circles formed on an imaging plane.

FIG. 2 illustrates two image circles (areas where optical images are formed; effective image circles) IC1 and IC2 formed on the image plane IP. An image circle IC1 is formed by the imaging lens L1 and the bending optical system A1, and an image circle IC2 is formed by the imaging lens L2 and the bending optical system A2. Thus, the attachment optical system according to each example can provide two images with parallax with a single image sensor.

An image captured by a stereoscopic optical system is observed using an observation optical system or a display device. A distance Din between the first optical axes OP1 of the two bending optical systems A1 and A2 is 40 mm or more and 80 mm or less, or 50 mm or more and 65 mm or less. This is because the base length of the human eye is about 60 mm, and placing the two bending optical systems A1 and A2 according to the interpupillary distance can provide a naturally stereoscopic image (video).

In order to secure a proper base length for a stereoscopic optical system, it is important to properly dispose the reflective members R11, R21, R12, and R22 of the two bending optical systems A1 and A2. As described below in each example, a large space is provided on the object side and the image side of each reflective member in order to eliminate light shielding. Therefore, in order to maintain the base length within the above range, the distance is reduced between the first optical axis OP1 and the third optical axis OP3 by devising the configuration of the attachment optical system. In addition, in order to relay the optical images by the imaging lenses L1 and L2, the attachment optical system has a desired imaging magnification, and the aberration is satisfactorily corrected. For this reason, the configuration of the attachment optical system is devised.

In each example, since the bending optical systems A1 and A2 are the same optical systems except for the reflecting directions of the bending optical systems A1 and A2, the bending optical system A1 will be described as a representative in the following description. Hereinafter, in this specification, the bending optical systems A1 and A2 are said to be the same optical systems in a case where the lens configurations and the like are the same except for the reflecting directions of the reflective members.

The bending optical system A1 according to each example will be described below.

Figure 3:
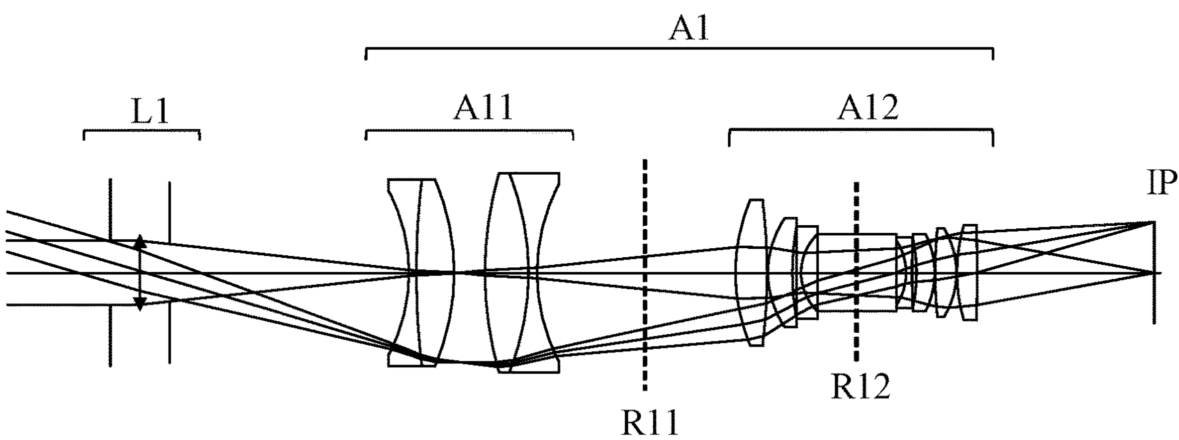
FIG. 3 is an optical sectional view of the attachment optical system according to Example 1 mounted with an ideal lens.
Figure 4:
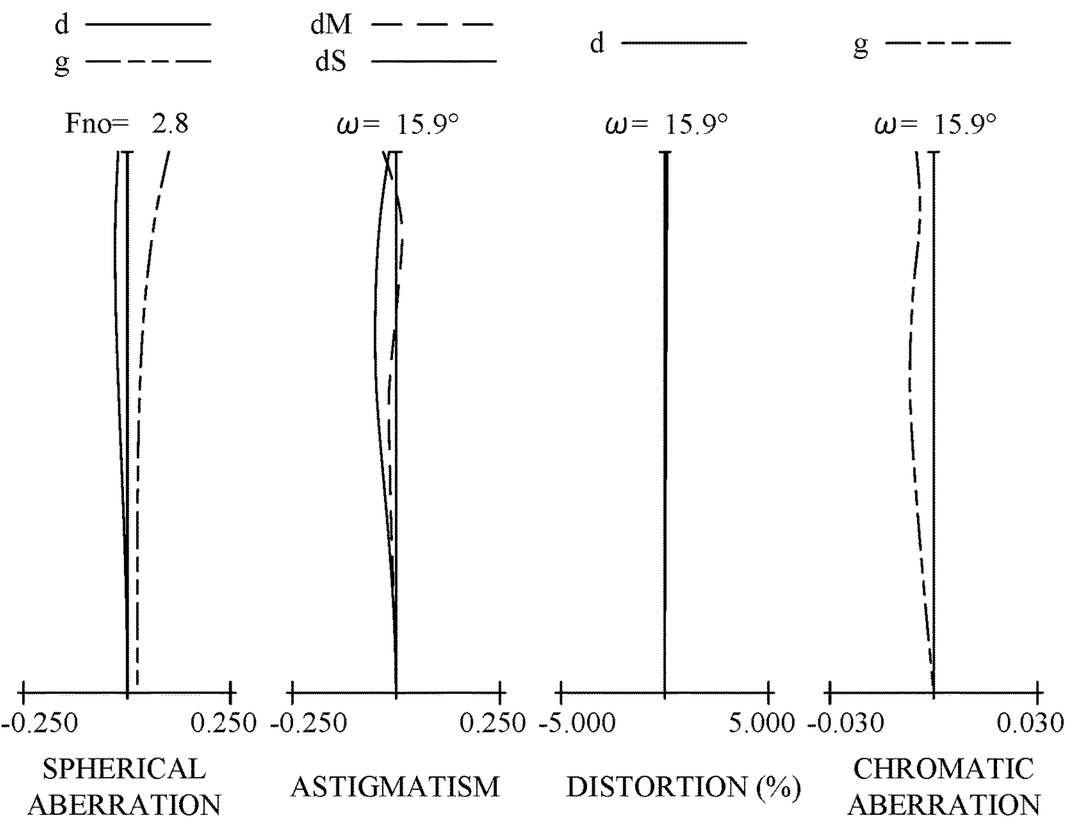
FIG. 4 is an aberration diagram of a relay image by the attachment optical system according to Example 1 mounted with the ideal lens.
Figure 5:
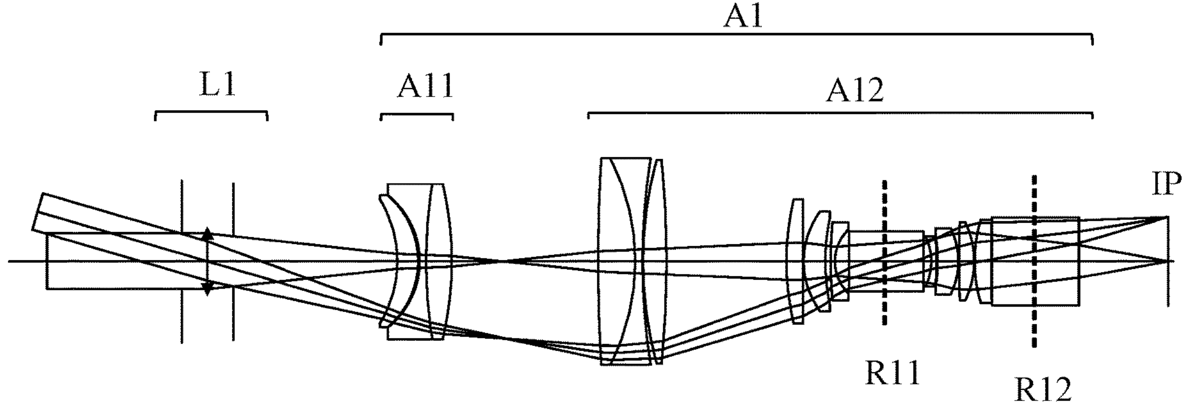
FIG. 5 is an optical sectional view of the attachment optical system according to Example 2 mounted with an ideal lens.
Figure 6:
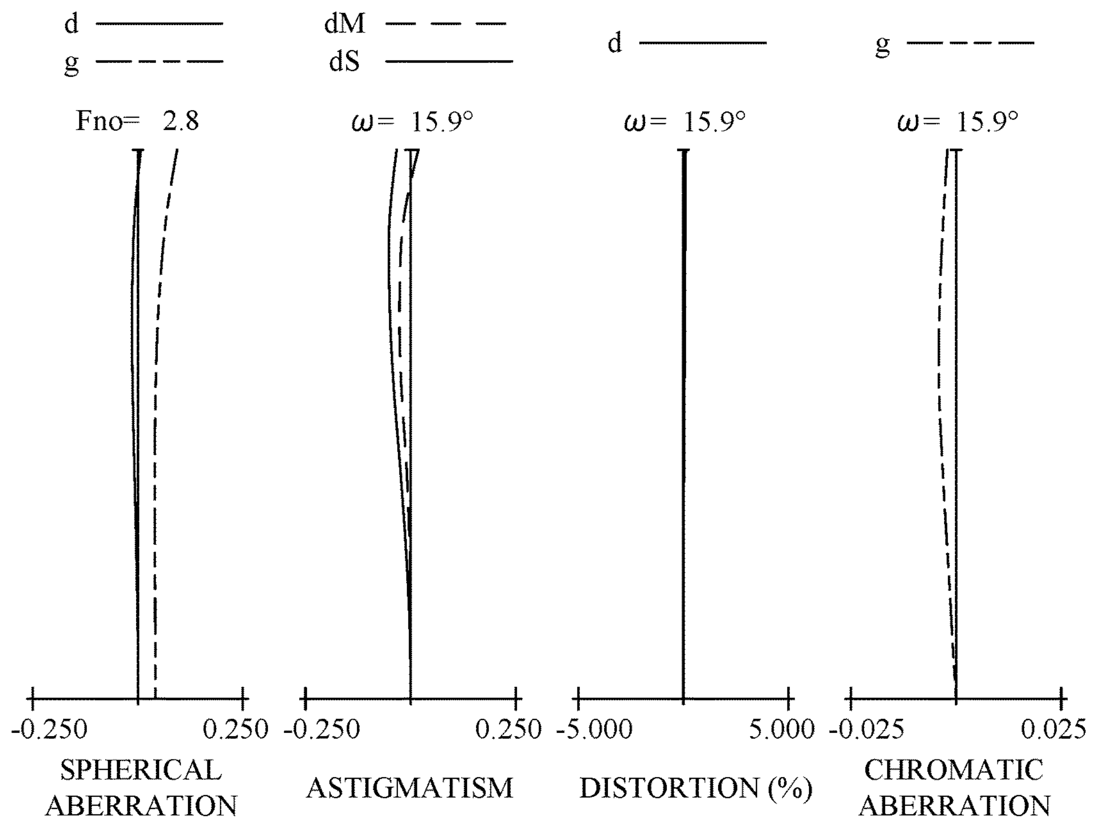
FIG. 6 is an aberration diagram of a relay image by the attachment optical system according to Example 2 mounted with the ideal lens.
Figure 7:
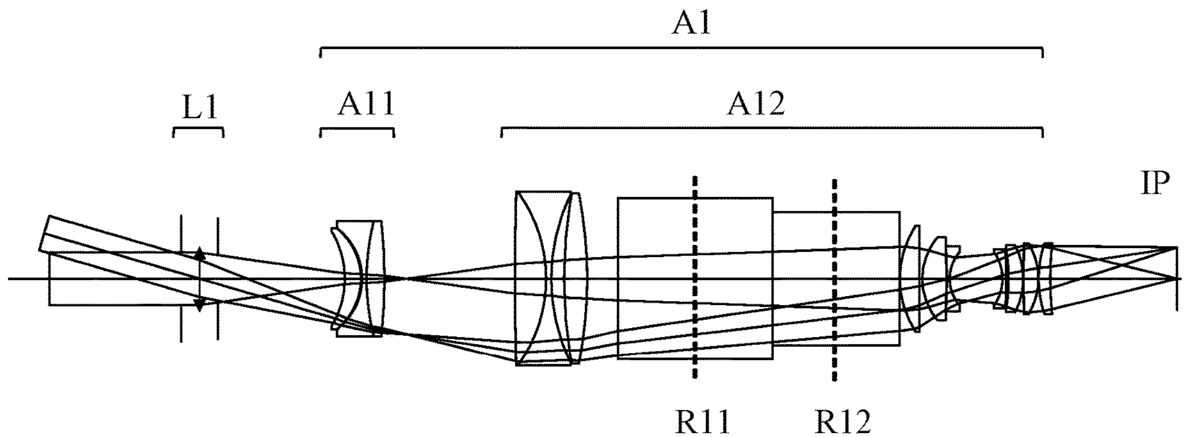
FIG. 7 is an optical sectional view of the attachment optical system according to Example 3 mounted with an ideal lens.
Figure 8:
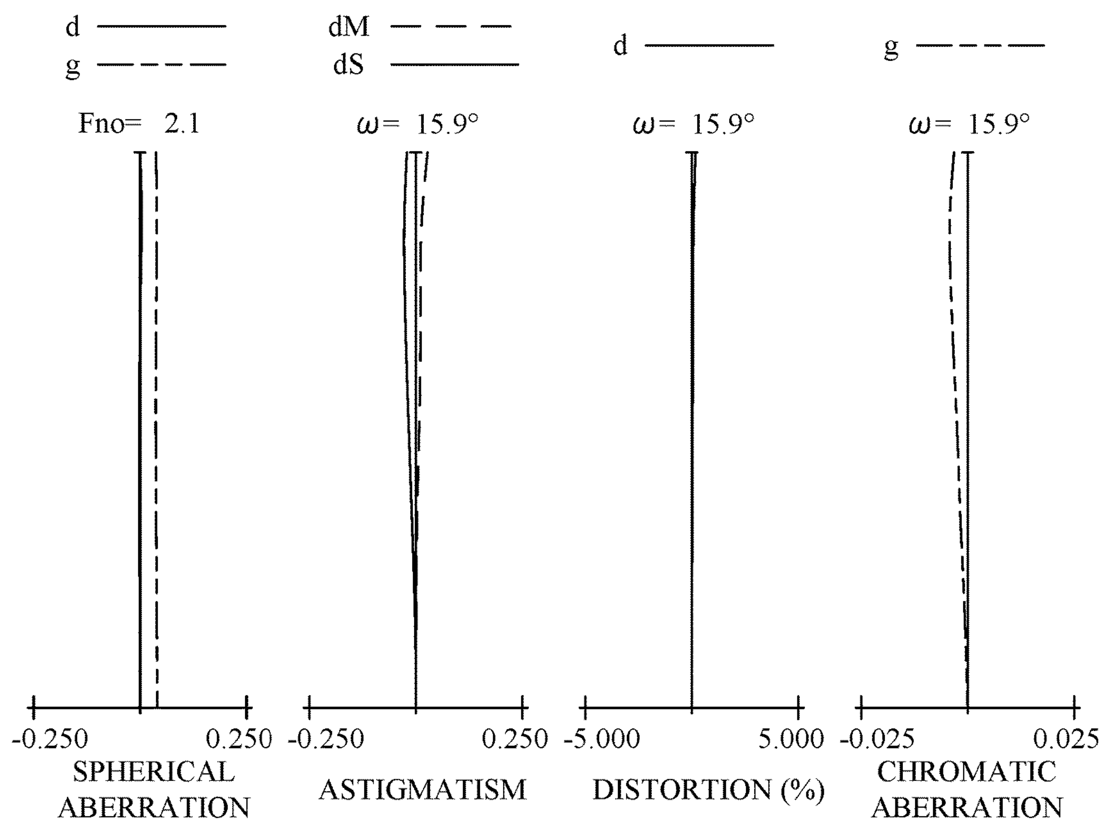
FIG. 8 is an aberration diagram of a relay image by the attachment optical system according to Example 3 mounted with the ideal lens.
Figure 9:
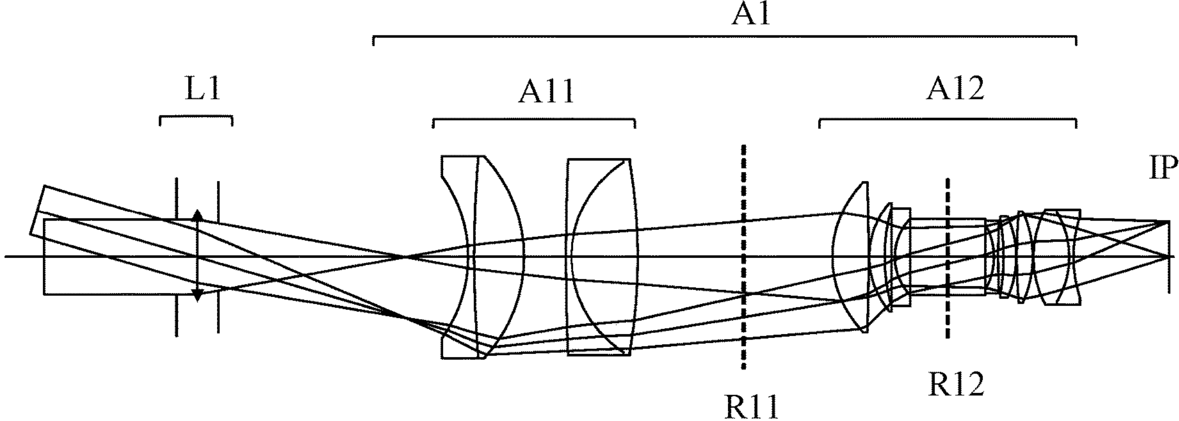
FIG. 9 is an optical sectional view of the attachment optical system according to Example 4 mounted with an ideal lens.
Figure 10:
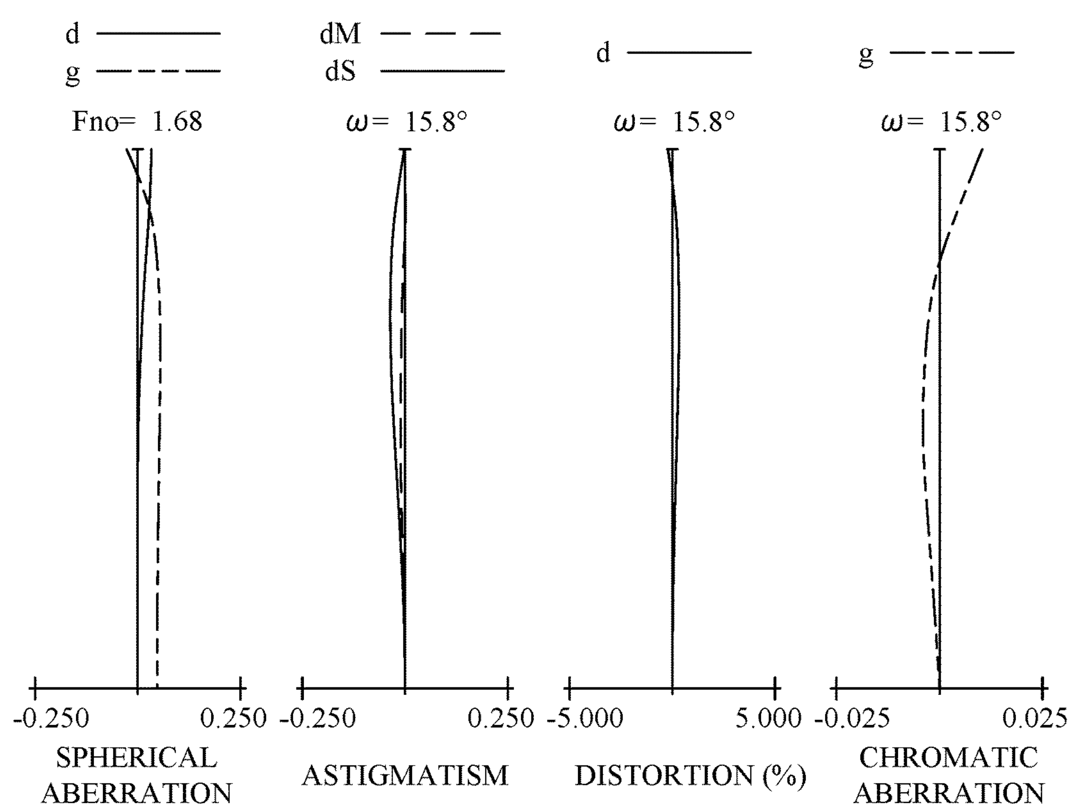
FIG. 10 is an aberration diagram of a relay image by the attachment optical system according to Example 4 mounted with the ideal lens.

FIG. 3 is an optical sectional view of the imaging lens L1 and the bending optical system A1 according to Example 1. FIG. 4 is an aberration diagram of a relay image by the bending optical system A1 according to Example 1 in a case where the imaging lens L1 is in an in-focus state at infinity. FIG. 5 is an optical sectional view of an imaging lens L1 and a bending optical system A1 according to Example 2. FIG. 6 is an aberration diagram of a relay image by the bending optical system A1 according to Example 2 in a case where the imaging lens L1 is in an in-focus state at infinity. FIG. 7 is an optical sectional view of an imaging lens L1 and a bending optical system A1 according to Example 3. FIG. 8 is an aberration diagram of a relay image by the bending optical system A1 according to Example 3 in a case where the imaging lens L1 is in an in-focus state at infinity. FIG. 9 is an optical sectional view of an imaging lens L1 and a bending optical system A1 according to Example 4. FIG. 10 is an aberration diagram of a relay image by the bending optical system A1 according to Example 4 in a case where the imaging lens L1 is in an in-focus state at infinity.

In each optical sectional view, a left side is an object side (front side), and a right side is an image side (rear side). In each optical sectional view, IP represents the image plane. In a case where the attachment optical system according to each example is used as the imaging optical system of a digital still camera or digital video camera, a solid-state image sensor (photoelectric conversion element) such as a CCD sensor or CMOS sensor is placed on the image plane IP. In a case where the attachment optical system according to each example is used as the imaging optical system of a silver-salt film camera, a photosensitive plane corresponding to a film plane is placed on the image plane IP.

In a spherical aberration diagram, Fno represents an F-number. The spherical aberration diagram illustrates spherical aberration amounts for the d-line (wavelength 587.6 nm) and g-line (wavelength 435.8 nm). In an astigmatism diagram, dS indicates an astigmatism amount on a sagittal image plane, and dM indicates an astigmatism amount on a meridional image plane. A distortion diagram illustrates a distortion amount for the d-line. A chromatic aberration diagram illustrates a chromatic aberration amount for the g-line. ω is an imaging half angle of view)(°).

The optical sectional view according to each example illustrates the reflective surface of the first reflective member R11 and the reflective surface of the second reflective member R12 as reference numerals R11 and R12, respectively, and unbends (unfolds) the optical axis bent by the reflective members R11 and R12. Each example secures a distance between the reflective surfaces by assuming that the second optical axis OP2 is an optical axis orthogonal to the first optical axis OP1 and the third optical axis OP3. Securing a longer distance between the reflective surfaces can make the reflection angle shallower and reduce the base length.

In the optical sectional view according to each example, the imaging lens L1 is indicated by an arrow as an aberration-free ideal imaging lens (ideal lens). The imaging lens L1 has one or more lenses in actual use, generally includes a plurality of lens units, and has a desired focal length and back focus like an interchangeable lens for a single-lens reflex camera.

In each example, the bending optical system A1 placed on the image side of the imaging lens L1 includes the first reflective member R11 and the second reflective member R12. As described above, the two reflective members R11 and R12 bend the light beam from the object to form a reduced relay image of the imaging lens L1 on the image plane IP.

In each example, the bending optical system A1 includes a plurality of lenses. In each example, the bending optical system A1 includes, in order from the object side to the image side, a front unit A11 and a rear unit A12. The front unit A11 and the rear unit A12 are disposed with the maximum air gap on the optical axis in the bending optical system A1. In the bending optical system A1, the first reflective member R11 or the second reflective member R12 is provided between the surface having refractive power and disposed closest to the object in the rear unit A12 and the surface having refractive power and disposed closest to the image plane in the rear unit A12. In Examples 1 and 4, the second reflective member R12 is disposed between the surface having refractive power and disposed closest to the object in the rear unit A12 and the surface having refractive power and disposed closest to the image plane in the rear unit A12. In Example 2, the first reflective member R11 is disposed between the surface having refractive power and disposed closest to the object in the rear unit A12 and the surface having refractive power and disposed closest to the image plane in the rear unit A12. In Example 3, the first reflective member R11 and the second reflective member R12 are disposed between the surface having refractive power and disposed closest to the object in the rear unit A12 and the surface having refractive power and disposed closest to the image plane in the rear unit A12.

In each example, the front unit A11 has positive refractive power. In order to reduce the size of the imaging lens L1, the imaging lens L1 has an exit pupil on the object side of the imaging plane of the imaging lens L1. In each example, the ideal lens position is the exit pupil. Since the rays emitted from the exit pupil enter the bending optical system A1 so that the principal rays spread, the lens system of the rear unit A12 can be reduced by making positive the refractive power of the front unit A11 in the bending optical system A1.

In each example, the front unit A11 includes three or four spherical lenses. The front unit A11 further includes at least one set of cemented lenses. Such a configuration can satisfactorily correct the lateral chromatic aberration and curvature of field that occur in the bending optical system A1. Although the front unit A11 includes three or more lenses in each example, an aspherical lens can be used to correct these aberrations with two aspherical lenses.

In each example, the rear unit A12 has a pupil conjugate with the exit pupil of the imaging lens L1 between the surface having refractive power and disposed closest to the object in the rear unit A12 and the surface having the refractive power and disposed closest to the image plane in the rear unit A12. Providing the pupil in the rear unit A12 can cancel symmetrical aberrations across the pupil, and thereby satisfactorily correct curvature of field, distortion, and lateral chromatic aberration of the bending optical system A1. In addition, since the on-axis ray and the off-axis ray converge near the pupil, the widths of all rays are reduced. That is, disposing the first reflective member R11 or the second reflective member R12 near the pupil can reduce the size of the reflecting surface, and thereby reduce the base length to the desired length described above.

Examples 1, 2, and 4 reduce the sizes of the reflective members R11 and R12 by disposing the reflective members R11 and R12 sandwiching the pupil in the rear unit A12. The reflective members R11 and R12, which are arranged to sandwich the pupil, reduce the optical path length and thus may include a prism having a refractive index of 1.5 or more. Example 3 places the reflective members R11 and R12 not sandwiching the pupil position, but places the reflective members R11 and R12 near the pupil position to reduce the sizes of the reflective members. Even in this case, disposing the reflective members R11 and R12 between the surface having refractive power and disposed closest to the object in the rear unit A12 and the surface having refractive power and disposed closest to the image plane in the rear unit A12 can reduce the sizes of the reflective members R11 and R12.

On the object side of this pupil, lenses having positive, positive, and negative refractive power may be arranged in order from the object side, and on the image side of this pupil, lenses having negative, positive, and positive refractive powers may be arranged in order from the object side. Making the lens arrangement symmetrical with respect to the pupil, that is, forming a so-called Gaussian configuration can satisfactorily correct various aberrations such as curvature of field and distortion. In Examples 1 and 4, three lenses having positive, positive, and negative refractive power are arranged in order from the object side between two reflective members R11 and R12. In Example 2, four lenses having negative, positive, positive, and positive are arranged in order from the object side between the two reflective members R11 and R12. Arranging the two reflective members R11 and R12 sandwiching the pupil in this manner can reduce the number of lenses between the two reflective members R11 and R12, and further reduce the base length.

Each example forms the rear unit A12 on the basis of the Gaussian type. However, the embodiment is not limited to this example as long as the reflective members R11 and R12 can be disposed near the pupil in the rear unit A12 and the number of lenses between the two reflective members R11 and R12 can be reduced. The number of lenses between the two reflective members R11 and R12 may be five or fewer, because the increased number of lenses prevents the base length from being short.

On the other hand, in the configuration that places the two reflective members R11 and R12 on the object side of the Gaussian lens as in Example 3, the reflective members R11 and R12 become slightly larger. However, the base length can be reduced by sandwiching no lens between the two reflective members R11 and R12. In this case, in order to reduce the air conversion length, the two reflective members R11 and R12 include a prism having a refractive index of 1.5 or more.

In each example, a focusing mechanism of each of the imaging lenses L1 and L2 attached to the object side of the attachment optical system can be utilized during focusing from infinity (an infinity object) to close (a close object). In a case where the imaging lenses L1 and L2 have different focus states, a so-called astigmatic state occurs in which the left and right eyes have different focus states during observations and thus the focusing mechanism may be mounted on the attachment optical system. Fixing the focus positions of the imaging lenses L1 and L2 at infinity and simultaneously driving the same lenses in the two bending optical systems A1 and A2 in the optical axis direction, the focus positions of the left and right eyes can be simultaneously adjusted.

A description will now be given of conditions that the attachment optical system according to each example may satisfy.

The attachment optical system according to each example may satisfy one or more of the following inequalities (1) to (3):

$$0.05 < Dout/Din < 0.50 \quad (1)$$

$$0.20 < fF/|fR| < 2.00 \quad (2)$$

$$-0.75 < \beta < -0.25 \quad (3)$$

Here, Din is a distance between surface vertices of lens surfaces closest to the object in the two bending optical systems A1 and A2. Dout is a distance between surface vertices of lens surfaces closest to the image plane in the two bending optical systems A1 and A2. fF is a focal length of the front unit A11. fR is a focal length of the rear unit A12. $\beta$ is a lateral magnification of each of the two bending optical systems A1 and A2.

Inequality (1) defines a ratio of the distance between the lens surfaces on the object side to the distance between the lens surfaces on the image side of the two bending optical systems A1 and A2. Satisfying inequality (1) can reduce the size of the entire image pickup apparatus while a sufficient base length is secured. In a case where the value Dout/Din becomes lower than the lower limit of inequality (1), the distance between the surface vertices of the lens surfaces closest to the image plane becomes too short, and the lenses on the third optical axes OP3 in the two bending optical systems A1 and A2 interfere with each other. Alternatively, the distance between the surface vertices of the lens surfaces closest to the object becomes too large and it becomes difficult to capture a stereoscopic image that looks natural to the human eyes. In a case where the value Dout/Din becomes higher than the upper limit of inequality (1), the distance between the surface vertices of the lens surfaces closest to the object becomes too small, and the base length cannot be secured. In this case as well, it becomes difficult to capture a stereoscopic image that looks natural to the human eyes. Alternatively, the distance between the surface vertices of the lens surfaces closest to the image plane becomes too large, and the size of the entire image pickup apparatus increases.

Inequality (2) defines a ratio of the focal length of the front unit A11 to the focal length of the rear unit A12 in each of the bending optical systems A1 and A2. In a case where the value fF/|fR| becomes lower than the lower limit of inequality (2), the refractive power of the front unit A11 becomes strong, which is beneficial to the miniaturization of the attachment optical system. However, in order to obtain a desired lateral magnification, the refractive power of the rear unit A12 is also increased, which causes the angle of the light beam to increase, and aberration correction becomes difficult. In a case where the value fF/|fR| becomes higher than the upper limit of inequality (2), the refractive power of the front unit A11 becomes too weak, the lens system of the rear unit A12 becomes too large, and the reflective member included in the rear unit A12 becomes too large. Hence, the distance between the surface vertices of the lens surface closest to the object becomes too large, and it becomes difficult to capture a stereoscopic image that looks natural to the human eyes.

Inequality (3) defines the lateral magnification $\beta$ of each of the bending optical systems A1 and A2. Assume that the size of the image plane IP is fixed. Then, whether or not images are formed on the image plane IP depends on which areas in the imaging lenses L1 and L2 the light beams pass through and the lateral magnification of the bending optical systems A1 and A2. Satisfactory aberration correction cannot be obtained in the peripheral portions of the imaging lenses L1 and L2. Nevertheless, images are formed on the image plane IP by the light beams that have passed a relatively narrow area around the optical axis of each of the imaging lenses L1 and L2, as the lateral magnification of the bending optical systems A1 and A2 becomes smaller. Since the light beams in the peripheral portions of the imaging lenses L1 and L2 are not used, the lateral magnification of the bending optical systems A1 and A2 may be smaller. On the other hand, as the lateral magnification of the bending optical systems A1 and A2 becomes smaller, an imaging angle of view of each of the imaging lenses L1 and L2 becomes narrower, and a proper magnification is set.

As the lateral magnification of the bending optical systems A1 and A2 becomes smaller, the refractive powers of the bending optical systems A1 and A2 become stronger, the distance in the optical axis direction of each of the bending optical systems A1 and A2 can be reduced for a compact structure. However, in a case where the lateral magnification is extremely small, the angle of the light beam incident on the relay lens system becomes large, and aberration correction becomes difficult. Conversely, in a case where the lateral magnification of the bending optical systems A1 and A2 is increased, the entire lens system becomes large in order to maintain excellent aberration correction. Alternatively, since the light beam that has passed through the relatively wide area of each of the imaging lenses L1 and L2 enters the image plane IP, the aberration correction states of the imaging lenses L1 and L2 significantly affect the imaging performance. Accordingly, inequality (3) defines the lateral magnification suitable for the bending optical systems in which the size of the image plane IP is fixed to that of the full-size sensor. In a case where the value $\beta$ becomes lower than the lower limit of inequality (3), the angles of the light beams incident on the bending optical systems A1 and A2 become large, and aberration correction becomes difficult. In a case where the value $\beta$ becomes higher than the upper limit of inequality (3), the bending optical systems A1 and A2 become large in order to maintain an excellent aberration correction states, and the aberration correction states of the imaging lenses L1 and L2 significantly affect the imaging performance.

In order to realize a smaller and higher-performance attachment optical system, inequalities (1) to (3) may be replaced with inequalities (1a) to (3a) below:

$$0.06 < Dout/Din < 0.40 \quad (1a)$$

$$0.21 < fF/|fR| < 1.80 \quad (2a)$$

$$-0.70 < \beta < -0.35 \quad (3a)$$

Inequalities (1) to (3) may be replaced with the following inequalities (1b) to (3b):

$$0.08 < Dout/Din < 0.30 \quad (1b)$$

$$0.22 < fF/|fR| < 1.60 \quad (2b)$$

$$-0.65 < \beta < -0.45 \quad (3b)$$

Examples 1 to 3 dispose the front unit A11 on the object side of the focus position of the imaging lens L1 in order to further reduce the size of the attachment optical system. An interchangeable lens for a single-lens reflex camera or a mirrorless camera has a predetermined flange back from the lens mount plane to the image plane IP. Placing the lens in this space can reduce the overall length of the attachment optical system and achieve miniaturization. Example 4 disposes the front unit A11 on the image side of the focal position of the imaging lens L1. The arrangement of the front unit A11 in Example 4 enables a diffusion plate to be disposed at the focus position of the imaging lens L1. Disposing the diffusion plate can relax the conjugate relationship between the exit pupil of the imaging lens L1 and the pupil of the bending optical system A1, and improve the design freedom. Thereby, a smaller or higher-performance attachment optical system can be provided.

A description will now be given of numerical examples 1 to 4 corresponding to Examples 1 to 4.

In surface data in each numerical example, r represents a radius of curvature of each optical surface, and d (mm) represents an on-axis distance (distance on the optical axis) between an m-th surface and an (m+1)-th surface, where m is the surface number counted from the light incident side. nd represents a refractive index for the d-line of each optical member, and vd represents an Abbe number of the optical member. The Abbe number vd of a certain material is expressed as follows:

$$vd = (Nd - 1)/(NF - NC)$$

where Nd, NF, and NC are refractive indexes based on the d-line (587.6 nm), the F-line (486.1 nm), and the C-line (656.3 nm) in the Fraunhofer line, respectively. The effective diameter means a maximum diameter of an area (effective area) in a lens surface through which an effective light beam that contributes to imaging passes.

In each numerical example, all values of d, a focal length (mm), an F-number, and half an angle of view)(° are set in a case where the optical system according to each example is in an in-focus state on an infinite object. "Back focus BF" is a distance on the optical axis from the final lens surface having refractive power (lens surface closest to the image plane) to the paraxial image plane, and expressed in air conversion length. An "overall lens length" is a length obtained by adding the back focus to the distance on the optical axis from the foremost lens surface (the lens surface closest to the object side) of the zoom lens to the final lens surface of the zoom lens. The "lens unit" includes one or more lenses.

Numerical Example 1

| IMAGING LENS | |
|---|---|
| Focal Length | 50.00 |
| FNo | 4.67 |
| Image Height | 14.25 |

| ATTACHMENT OPTICAL SYSTEM | |
|---|---|
| Focal Length | −95.59 |
| Focal Length of Front Unit | 41.11 |
| Focal Length of Rear Unit | 32.67 |
| Lateral Magnification | −0.60 |
| Overall Lens Length | 96.08 |

SURFACE DATA

| Surface No | r | d | nd | vd | Effective Diameter |
|---|---|---|---|---|---|
| 0 | | 45.52 | | | |
| 1 | −29.234 | 1.20 | 1.51633 | 64.1 | 26.00 |
| 2 | 126.496 | 6.42 | 2.00069 | 25.5 | 29.10 |
| 3 | −39.493 | 5.17 | | | 30.00 |
| 4 | 59.487 | 7.41 | 1.96300 | 24.1 | 31.70 |
| 5 | −44.100 | 1.40 | 1.51823 | 58.9 | 31.30 |
| 6 | 32.163 | 18.47 | | | 28.10 |
| 7 | ∞ | 15.10 | | | 42.40 |
| 8 | 30.953 | 5.38 | 1.88300 | 40.8 | 22.70 |
| 9 | −92.127 | 0.10 | | | 21.50 |
| 10 | 16.091 | 4.15 | 1.88300 | 40.8 | 17.40 |
| 11 | 43.500 | 0.69 | | | 14.70 |
| 12 | 1356.279 | 0.80 | 1.77830 | 23.9 | 14.50 |
| 13 | 9.045 | 2.75 | | | 12.00 |
| 14 | ∞ | 6.70 | 1.51633 | 64.1 | 11.90 |
| 15 | ∞ | 6.70 | 1.51633 | 64.1 | 19.00 |
| 16 | ∞ | 1.66 | | | 10.00 |
| 17 | −9.937 | 1.00 | 1.63980 | 34.5 | 10.00 |
| 18 | 147.010 | 0.75 | | | 10.70 |
| 19 | −27.958 | 3.05 | 1.88300 | 40.8 | 10.80 |
| 20 | −14.467 | 0.10 | | | 11.90 |
| 21 | 76.301 | 3.58 | 1.49700 | 81.5 | 12.90 |
| 22 | −14.310 | 0.10 | | | 13.80 |
| 23 | 28.420 | 3.40 | 1.49700 | 81.5 | 14.90 |
| 24 | −353.815 | 30.02 | | | 15.00 |
| Image Plane | ∞ | | | | |

| IMAGING LENS + ATTACHMENT OPTICAL SYSTEM | |
|---|---|
| Focal Length | −30.04 |
| FNo | 2.80 |
| Half Angle of View (°) | 15.89 |
| Image Height | 8.55 |
| BF | 30.02 |

Numerical Example 2

| IMAGING LENS | |
|---|---|
| Focal Length | 50.00 |
| FNo | 4.67 |
| Image Height | 14.25 |

-continued

| ATTACHMENT OPTICAL SYSTEM | |
|---|---|
| Focal Length | −81.05 |
| Focal Length of Front Unit | 120.36 |
| Focal Length of Rear Unit | 530.73 |
| Lateral Magnification | −0.60 |
| Overall Lens Length | 131.88 |

SURFACE DATA

| Surface No | r | d | nd | νd | Effective Diameter |
|---|---|---|---|---|---|
| 0 | | 36.80 | | | |
| 1 | −22.794 | 4.00 | 2.00100 | 29.1 | 22.20 |
| 2 | −16.842 | 0.30 | | | 23.80 |
| 3 | −16.247 | 1.20 | 1.53172 | 48.8 | 23.70 |
| 4 | 90.120 | 5.00 | 2.00100 | 29.1 | 27.40 |
| 5 | −64.622 | 28.35 | | | 28.10 |
| 6 | 307.190 | 7.20 | 1.95375 | 32.3 | 37.70 |
| 7 | −43.755 | 1.40 | 1.53172 | 48.8 | 38.10 |
| 8 | 125.881 | 0.10 | | | 37.60 |
| 9 | 74.658 | 4.55 | 1.88300 | 40.8 | 37.70 |
| 10 | −195.909 | 23.15 | | | 37.40 |
| 11 | 51.767 | 3.20 | 1.88300 | 40.8 | 22.20 |
| 12 | 2684.644 | 0.10 | | | 21.20 |
| 13 | 16.068 | 4.20 | 1.95375 | 32.3 | 18.10 |
| 14 | 39.361 | 1.05 | | | 15.50 |
| 15 | 79.949 | 0.80 | 1.80809 | 22.8 | 13.90 |
| 16 | 8.457 | 2.70 | | | 11.10 |
| 17 | ∞ | 7.25 | 1.51633 | 64.1 | 10.60 |
| 18 | ∞ | 7.25 | 1.51633 | 64.1 | 20.60 |
| 19 | ∞ | 1.55 | | | 8.70 |
| 20 | −11.043 | 1.00 | 1.68430 | 26.8 | 8.60 |
| 21 | −70.466 | 0.23 | | | 8.90 |
| 22 | −30.444 | 4.00 | 1.88300 | 40.8 | 8.90 |
| 23 | −14.396 | 0.10 | | | 11.80 |
| 24 | 162.431 | 2.95 | 1.49700 | 81.5 | 13.10 |
| 25 | −17.422 | 0.10 | | | 13.90 |
| 26 | 27.834 | 3.25 | 1.59522 | 67.7 | 15.00 |
| 27 | 646.299 | 0.10 | | | 15.00 |
| 28 | ∞ | 8.40 | 1.51633 | 64.1 | 15.10 |
| 29 | ∞ | 8.40 | 1.51633 | 64.1 | 23.80 |
| 30 | ∞ | 17.33 | | | 15.90 |
| Image Plane | ∞ | | | | |

| IMAGING LENS + ATTACHMENT OPTICAL SYSTEM | |
|---|---|
| Focal Length | −30.09 |
| FNo | 2.80 |
| Half Angle of View (°) | 15.86 |
| Image Height | 8.55 |
| BF | 17.33 |

Numerical Example 3

| IMAGING LENS | |
|---|---|
| Focal Length | 50.00 |
| FNo | 3.50 |
| Image Height | 14.25 |

| ATTACHMENT OPTICAL SYSTEM | |
|---|---|
| Focal Length | −73.23 |
| Focal Length of Front Unit | 166.26 |
| Focal Length of Rear Unit | −343.44 |
| Lateral Magnification | −0.60 |
| Overall Lens Length | 192.77 |

SURFACE DATA

| Surface No | r | d | nd | νd | Effective Diameter |
|---|---|---|---|---|---|
| 0 | | 39.86 | | | |
| 1 | −24.693 | 4.37 | 1.95375 | 32.3 | 24.04 |
| 2 | −17.721 | 0.30 | | | 25.54 |
| 3 | −17.166 | 1.20 | 1.48749 | 70.2 | 25.51 |
| 4 | 62.529 | 4.92 | 2.00100 | 29.1 | 29.09 |
| 5 | −138.500 | 35.59 | | | 29.52 |
| 6 | 884.609 | 8.50 | 1.96300 | 24.1 | 45.24 |
| 7 | −40.255 | 1.40 | 1.54814 | 45.8 | 45.50 |
| 8 | 52.677 | 3.48 | | | 44.48 |
| 9 | 127.425 | 6.50 | 1.90043 | 37.4 | 44.71 |
| 10 | −118.752 | 8.33 | | | 44.81 |
| 11 | ∞ | 21.13 | 1.51633 | 64.1 | 42.00 |
| 12 | ∞ | 21.13 | 1.51633 | 64.1 | 59.76 |
| 13 | ∞ | 0.00 | | | 34.56 |
| 14 | ∞ | 17.38 | 1.51633 | 64.1 | 34.56 |
| 15 | ∞ | 17.38 | 1.51633 | 64.1 | 49.16 |
| 16 | ∞ | 0.10 | | | 28.44 |
| 17 | 26.223 | 5.42 | 1.72916 | 54.7 | 27.38 |
| 18 | −931.274 | 0.72 | | | 26.43 |
| 19 | 17.533 | 6.58 | 1.49700 | 81.5 | 20.89 |
| 20 | −197.011 | 0.10 | | | 16.88 |
| 21 | −141.451 | 0.80 | 1.86966 | 20.0 | 16.76 |
| 22 | 11.189 | 14.40 | | | 13.59 |
| 23 | −12.411 | 1.00 | 1.68430 | 26.8 | 13.44 |
| 24 | −191.115 | 0.66 | | | 15.15 |
| 25 | −46.049 | 4.00 | 1.94594 | 18.0 | 15.32 |
| 26 | −19.523 | 0.10 | | | 17.12 |
| 27 | 358.638 | 4.00 | 1.53775 | 74.7 | 18.00 |
| 28 | −18.820 | 0.10 | | | 18.36 |
| 29 | 29.467 | 3.18 | 1.59522 | 67.7 | 18.00 |
| 30 | 88.228 | 34.75 | | | 17.80 |
| Image Plane | ∞ | | | | |

| IMAGING LENS + ATTACHMENT OPTICAL SYSTEM | |
|---|---|
| Focal Length | −30.11 |
| FNo | 2.10 |
| Half Angle of View (°) | 15.85 |
| Image Height | 8.55 |
| BF | 34.75 |

Numerical Example 4

| IMAGING LENS | |
|---|---|
| Focal Length | 50.00 |
| FNo | 2.80 |
| Image Height | 14.25 |

| ATTACHMENT OPTICAL SYSTEM | |
|---|---|
| Focal Length | −220.42 |
| Focal Length of Front Unit | 60.36 |
| Focal Length of Rear Unit | 39.44 |
| Lateral Magnification | −0.60 |
| Overall Lens Length | 145.30 |

SURFACE DATA

| Surface No | r | d | nd | νd | Effective Diameter |
|---|---|---|---|---|---|
| 0 | | 65.00 | | | |
| 1 | −33.333 | 1.40 | 1.59270 | 35.3 | 37.20 |
| 2 | 281.995 | 12.00 | 1.95906 | 17.5 | 45.30 |
| 3 | −35.412 | 10.00 | | | 47.00 |
| 4 | 499.448 | 1.40 | 1.72825 | 28.5 | 45.10 |
| 5 | 26.958 | 16.00 | 1.65160 | 58.5 | 43.90 |
| 6 | −133.973 | 23.30 | | | 44.00 |
| 7 | ∞ | 23.30 | | | 65.90 |
| 8 | 25.441 | 8.84 | 1.75500 | 52.3 | 34.50 |
| 9 | −487.463 | 0.10 | | | 33.00 |
| 10 | 19.827 | 3.73 | 1.77250 | 49.6 | 24.30 |
| 11 | 43.426 | 1.65 | | | 22.40 |
| 12 | −1519.289 | 0.80 | 1.89286 | 20.4 | 21.80 |
| 13 | 13.306 | 3.65 | | | 17.30 |
| 14 | ∞ | 9.00 | 1.51633 | 64.1 | 17.10 |
| 15 | ∞ | 9.00 | 1.51633 | 64.1 | 25.50 |

-continued

| | | | | | |
|---|---|---|---|---|---|
| 16 | ∞ | 2.10 | | | 14.80 |
| 17 | −15.890 | 1.00 | 1.86966 | 20.0 | 14.80 |
| 18 | 165.637 | 1.30 | | | 16.40 |
| 19 | −53.263 | 3.03 | 1.95375 | 32.3 | 16.90 |
| 20 | −24.054 | 0.10 | | | 18.30 |
| 21 | 116.951 | 3.90 | 1.95906 | 17.5 | 19.70 |
| 22 | −25.621 | 0.10 | | | 20.40 |
| 23 | 24.154 | 8.60 | 1.77250 | 49.6 | 21.10 |
| 24 | −20.963 | 1.00 | 1.80810 | 22.8 | 19.80 |
| 25 | 30.816 | 23.13 | | | 18.30 |
| Image Plane | ∞ | | | | |

IMAGING LENS + ATTACHMENT OPTICAL SYSTEM

| | |
|---|---|
| Focal Length | −30.15 |
| FNo | 1.68 |
| Half Angle of View (°) | 15.83 |
| Image Height | 8.55 |
| BF | 23.13 |

Table 1 below summarizes various numerical values in each example.

TABLE 1

| | | Numerical Example 1 | Numerical Example 2 | Numerical Example 3 | Numerical Example 4 |
|---|---|---|---|---|---|
| | Din | 88.440 | 74.960 | 94.120 | 119.240 |
| | Dout | 17.100 | 17.100 | 17.100 | 17.100 |
| | fF | 41.107 | 120.361 | 166.261 | 60.356 |
| | fR | 32.666 | 530.725 | −343.438 | 39.442 |
| | β | −0.601 | −0.602 | −0.602 | −0.603 |
| (1) | Dout/Din | 0.193 | 0.228 | 0.182 | 0.143 |
| (2) | fF/\|fR\| | 1.258 | 0.227 | 0.484 | 1.530 |
| (3) | β | −0.601 | −0.602 | −0.602 | −0.603 |

Image Pickup Apparatus

Figure 11:
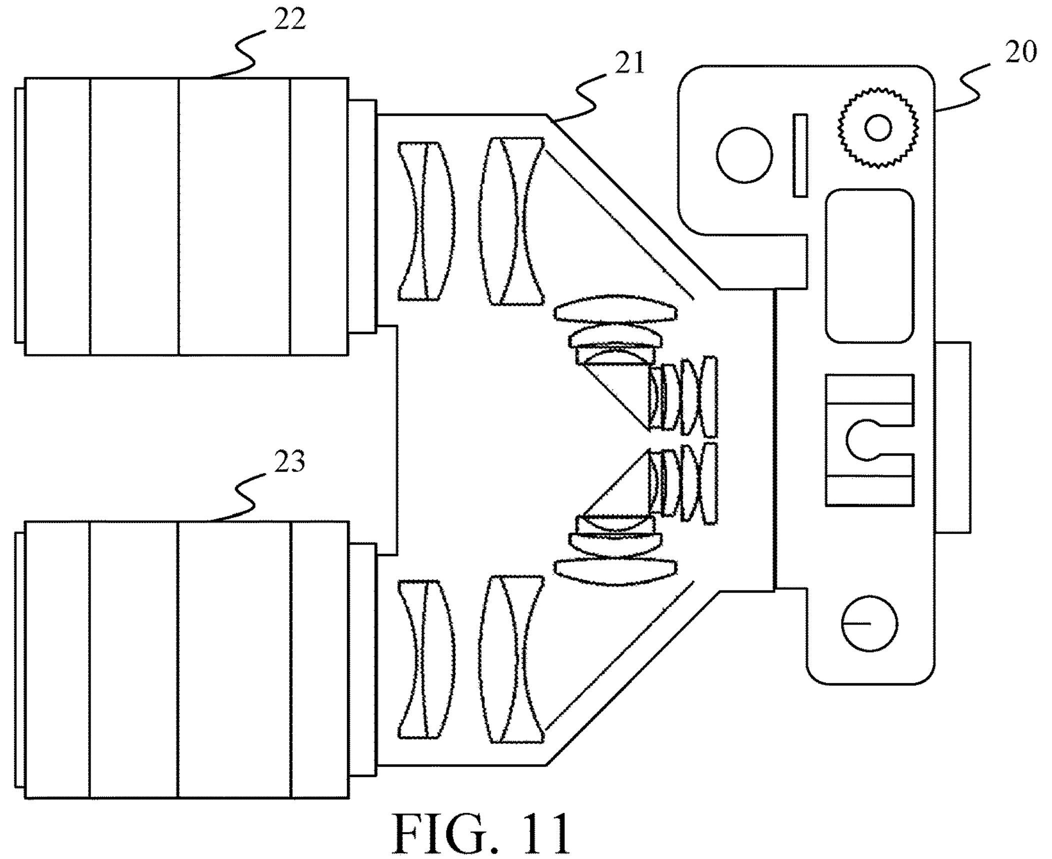
FIG. 11 is a schematic diagram of an image pickup apparatus.

Referring now to FIG. 11, a description will be given of an illustrative image pickup apparatus using the attachment optical system according to each example as an imaging optical system. FIG. 11 is a schematic diagram of a principal part of a camera (image pickup apparatus) that includes the attachment optical system according to each example.

In FIG. 11, reference numeral 20 denotes a camera body, and reference numeral 21 denotes the imaging optical system as any one of the attachment optical systems according to Examples 1 to 4. Reference numerals 22 and 23 denote interchangeable lenses attached to the lens interchangeable type camera, and the attachment optical system 21 forms optical images through these interchangeable lenses on a single solid-state image sensor in the camera body 20. The interchangeable lenses 22 and 23 are imaging lens systems for an image pickup apparatus such as a video camera, a digital camera, and a film-based camera. The object image formed on the solid-state image sensor can be observed through the liquid crystal display panel or viewfinder of the camera body 20.

Thus, applying the attachment optical system 21 according to each example to an image pickup apparatus such as a lens interchangeable type camera enables the user to arbitrarily change the imaging range and to acquire higher quality stereoscopic imaging.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-105842, filed on Jun. 30, 2022, which is hereby incorporated by reference herein in its entirety.

What is claimed is:

1. An attachment optical system, to which an imaging lens is attachable on an object side of the attachment optical system, the attachment optical system comprising two bending optical systems arranged in parallel, wherein each of the two bending optical systems includes a first reflective member and a second reflective member, wherein each of the two bending optical systems includes, in order from the object side to an image side, a front unit and a rear unit, which are separated by a maximum air gap on an optical axis in each bending optical system, and wherein at least one of the first reflective member and the second reflective member is disposed between a surface having refractive power and disposed closest to an object in the rear unit and a surface having refractive power and disposed closest to an image plane in the rear unit of each bending optical system, wherein the following inequality is satisfied:

$$-0.75 < \beta < -0.25$$

where β is a lateral magnification of each bending optical system.

2. The attachment optical system according to claim 1, wherein the following inequality is satisfied:

$$0.05 < Dout/Din < 0.50$$

where Din is a distance between surface vertices of lens surfaces closest to the object in the two bending optical systems, and Dout is a distance between surface vertices of lens surfaces closest to the image plane in the two bending optical systems.

3. The attachment optical system according to claim 1, wherein the front unit has positive refractive power.

4. The attachment optical system according to claim 1, wherein the following inequality is satisfied:

$$0.20 < fF/|fR| < 2.00$$

where fF is a focal length of the front unit, and fR is a focal length of the rear unit.

5. The attachment optical system according to claim 1, wherein the front unit is disposed on the object side of a focus position of the imaging lens.

6. The attachment optical system according to claim 1, wherein the front unit is disposed on the image side of a focal position of the imaging lens.

7. The attachment optical system according to claim 1, wherein five lenses or fewer are disposed between the first reflective member and the second reflective member in the attachment optical system.

8. The attachment optical system according to claim 1, wherein the front unit includes three or four spherical lenses.

9. The attachment optical system according to claim 1, wherein the front unit includes a set of cemented lenses.

10. The attachment optical system according to claim 1, wherein the two bending optical systems are the same optical systems.

11. An image pickup apparatus comprising:

an attachment optical system, to which an imaging lens is attachable on an object side of the attachment optical system, the attachment optical system including two bending optical systems arranged in parallel; and an image sensor configured to capture optical images formed by the two bending optical systems, wherein each of the two bending optical systems includes a first reflective member and a second reflective member, wherein each of the two bending optical systems includes, in order from the object side to an image side, a front unit and a rear unit, which are separated by a maximum air gap on an optical axis in each bending optical system, and wherein at least one of the first reflective member and the second reflective member is disposed between a surface having refractive power and disposed closest to an object in the rear unit and a surface having refractive power and disposed closest to an image plane in the rear unit of each bending optical system, wherein the following inequality is satisfied:

$$-0.75 < \beta < -0.25$$

where β is a lateral magnification of each bending optical system.

12. The image pickup apparatus according to claim 11, wherein the two bending optical systems are arranged in parallel with respect to the image sensor.

13. An attachment optical system, to which an imaging lens is attachable on an object side of the attachment optical system, the attachment optical system comprising two bending optical systems arranged in parallel, wherein each of the two bending optical systems includes a first reflective member and a second reflective member, wherein each of the two bending optical systems includes, in order from the object side to an image side, a front unit and a rear unit, which are separated by a maximum air gap on an optical axis in each bending optical system, and wherein at least one of the first reflective member and the second reflective member is disposed between a surface having refractive power and disposed closest to an object in the rear unit and a surface having refractive power and disposed closest to an image plane in the rear unit of each bending optical system, wherein the following inequality is satisfied:

$$0.20 < fF/|fR| < 2.00$$

where fF is a focal length of the front unit, and fR is a focal length of the rear unit.

14. An attachment optical system, to which an imaging lens is attachable on an object side of the attachment optical system, the attachment optical system comprising two bending optical systems arranged in parallel, wherein each of the two bending optical systems includes a first reflective member and a second reflective member, wherein each of the two bending optical systems includes, in order from the object side to an image side, a front unit and a rear unit, which are separated by a maximum air gap on an optical axis in each bending optical system, and wherein at least one of the first reflective member and the second reflective member is disposed between a surface having refractive power and disposed closest to an object in the rear unit and a surface having refractive power and disposed closest to an image plane in the rear unit of each bending optical system, wherein the front unit includes three or four spherical lenses.

15. An attachment optical system, to which an imaging lens is attachable on an object side of the attachment optical system, the attachment optical system comprising two bending optical systems arranged in parallel, wherein each of the two bending optical systems includes a first reflective member and a second reflective member, wherein each of the two bending optical systems includes, in order from the object side to an image side, a front unit and a rear unit, which are separated by a maximum air gap on an optical axis in each bending optical system, and wherein at least one of the first reflective member and the second reflective member is disposed between a surface having refractive power and disposed closest to an object in the rear unit and a surface having refractive power and disposed closest to an image plane in the rear unit of each bending optical system, wherein the front unit includes a set of cemented lenses.

* * * * *